US 9,231,762 B2

(12) United States Patent
Enomoto

(10) Patent No.: US 9,231,762 B2
(45) Date of Patent: Jan. 5, 2016

(54) METHOD OF SECURE COMMUNICATION, CONTROLLED DEVICE, AND CONTROL PROGRAM

(71) Applicant: Junya Enomoto, Tokyo (JP)

(72) Inventor: Junya Enomoto, Tokyo (JP)

(*) Notice: Subject to any disclaimer, the term of this patent is extended or adjusted under 35 U.S.C. 154(b) by 0 days.

(21) Appl. No.: 14/538,984

(22) Filed: Nov. 12, 2014

(65) Prior Publication Data

US 2015/0055779 A1 Feb. 26, 2015

Related U.S. Application Data

(63) Continuation of application No. PCT/JP2013/052280, filed on Jan. 31, 2013.

(30) Foreign Application Priority Data

May 13, 2012 (JP) .................................. 2012-110146

(51) Int. Cl.
| | | |
|---|---|---|
| H04K 1/00 | (2006.01) |
| H04L 9/30 | (2006.01) |
| G08C 17/00 | (2006.01) |
| H04L 9/08 | (2006.01) |
| H04L 9/32 | (2006.01) |

(Continued)

(52) U.S. Cl.
CPC .......... *H04L 9/30* (2013.01); *G08C 17/00* (2013.01); *G08C 17/02* (2013.01); *H04L 9/0822* (2013.01); *H04L 9/0869* (2013.01); *H04L 9/3273* (2013.01); *H04W 12/04* (2013.01); *G08C 2201/20* (2013.01); *G08C 2201/42* (2013.01); *G08C 2201/60* (2013.01); *G08C 2201/62* (2013.01)

(58) Field of Classification Search
None
See application file for complete search history.

(56) References Cited

U.S. PATENT DOCUMENTS 5,943,423 A * 8/1999 Muftic .................... G06F 21/33
705/58
7,107,462 B2 * 9/2006 Fransdonk .................... 713/193

(Continued)

FOREIGN PATENT DOCUMENTS

| JP | H10-161880 A | 6/1998 |
|---|---|---|
| JP | 2002-354557 A | 12/2002 |

(Continued)

OTHER PUBLICATIONS

Marc the Geek, Control PS3 Youtube App with Android Phone or Tablet, Published on Aug 15, 2012, Retrieved on Jun. 23, 2015, pp. 1-5 (https://www.youtube.com/watch?v=EDqOZosb794 ).*

*Primary Examiner* — Jason K. Gee
*Assistant Examiner* — Olanrewaju Bucknor
(74) *Attorney, Agent, or Firm* — Marvin A. Motsenbocker; Mots Law, PLLC

(57) ABSTRACT

A controlled device generates an authentication random number. A control device accepts input of a random number from an input device. The controlled device verifies if the displayed authentication random number and the random number transferred from the control device are identical to transfer a public key of the controlled device to the control device. The controlled device generates a token. The control device encrypts the token with the public key of the controlled device. The controlled device decrypts the token and verifies if the token transferred from the control device and the generated token are identical to generate a session key. The control device stores the session key into the storage device. The control device controlling the controlled device by encrypted communication using the session key.

9 Claims, 5 Drawing Sheets

(51) Int. Cl.
*H04W 12/04* (2009.01)
*G08C 17/02* (2006.01)

(56) References Cited

U.S. PATENT DOCUMENTS

| | | | |
|---|---|---|---|
| 8,014,530 B2 * | 9/2011 | Brickell et al. | 380/286 |
| 8,079,068 B2 * | 12/2011 | Adams | H04W 12/06 380/270 |
| 8,112,794 B2 * | 2/2012 | Little | H04L 63/0853 380/270 |
| 8,209,753 B2 * | 6/2012 | Wen et al. | 726/20 |
| 8,732,459 B2 * | 5/2014 | Leedom, Jr. | H04L 63/068 705/317 |
| 2002/0180581 A1 | 12/2002 | Kamiwada et al. | |
| 2004/0117623 A1 * | 6/2004 | Kalogridis | H04L 63/0807 713/165 |
| 2005/0160297 A1 * | 7/2005 | Ogawa | 713/202 |
| 2006/0239452 A1 | 10/2006 | Jung et al. | |
| 2007/0198848 A1 * | 8/2007 | Bjorn | G06F 21/358 713/186 |
| 2008/0034440 A1 * | 2/2008 | Holtzman et al. | 726/27 |
| 2010/0017612 A1 | 1/2010 | Aihara | |
| 2010/0043056 A1 | 2/2010 | Ganapathy | |
| 2010/0162294 A1 * | 6/2010 | Yin et al. | 725/30 |
| 2011/0225640 A1 | 9/2011 | Ganapathy et al. | |
| 2011/0231651 A1 * | 9/2011 | Bollay | 713/152 |
| 2012/0144473 A1 * | 6/2012 | Wyld | 726/7 |
| 2012/0209916 A1 | 8/2012 | Azuma et al. | |
| 2013/0014138 A1 * | 1/2013 | Bhatia et al. | 725/9 |
| 2014/0089992 A1 * | 3/2014 | Varoglu et al. | 725/81 |

FOREIGN PATENT DOCUMENTS

| | | |
|---|---|---|
| JP | 2006-311516 A | 11/2006 |
| JP | 2009-016952 A | 1/2009 |
| JP | 2011-086232 A | 4/2011 |
| JP | 2011-530957 A | 12/2011 |

\* cited by examiner

METHOD OF SECURE COMMUNICATION, CONTROLLED DEVICE, AND CONTROL PROGRAM

CROSS REFERENCE TO RELATED APPLICATIONS

This application is a continuation application of International Application No. PCT/JP2013/052280, filed on Jan. 31, 2013, entitled "METHOD OF SECURE COMMUNICATION, CONTROLLED DEVICE, AND CONTROL PROGRAM", which claims priority based on Article 8 of Patent Cooperation Treaty from prior Japanese Patent Application No. 2012-110146, filed on May 13, 2012, the entire contents of which are incorporated herein by reference.

TECHNICAL FIELD

The invention relates to a method of secure communication between devices.

BACKGROUND ART

Japanese Patent Application Publication No. 2011-86232 (Patent Literature 1) discloses a technique for controlling a liquid crystal display television from a mobile phone over a wireless LAN (paragraph 0035 of the Patent Literature 1). When the mobile phone enters an area in which the liquid crystal display television is located, a process for connecting the liquid crystal display television and the mobile phone is performed (paragraph 0146 of the Patent Literature 1).

On the assumption that the above-described area is an area of a wireless LAN and includes two or more liquid crystal display televisions (controlled devices), the mobile phone (control device) becomes capable of controlling all controlled devices within the area unless otherwise limited. In that case, a control device which is supposed to control a predetermined controlled device may accidentally control another controlled device.

SUMMARY OF THE INVENTION

An embodiment of the invention provides a method of secure communication between a control device and a controlled device over a wireless LAN, the method including: pairing; activation; and secure communication, wherein the pairing including: the controlled device generating an authentication random number, storing the authentication random number into a storage device, and displaying the authentication random number on a display device; the control device accepting input of a random number from an input device and transferring the inputted random number to the controlled device by encrypted communication; and the controlled device verifying whether or not the displayed authentication random number and the random number transferred from the control device are identical, and, if the two numbers are identical, transferring a public key of the controlled device to the control device by encrypted communication, and causing the control device to store the public key into a storage device, the activation including: the controlled device generating a token, storing the token into the storage device, and transferring the token to the control device by encrypted communication; the control device encrypting the token with the public key of the controlled device and transferring the encrypted token to the controlled device; and the controlled device decrypting the token transferred from the control device with a private key corresponding to the public key, verifying whether or not the token transferred from the control device and the generated token are identical, and, if the two tokens are identical, generating a session key, storing the session key into the storage device, transferring the session key to the control device by encrypted communication, and causing the control device to store the session key into the storage device, and the secure communication including: the control device controlling the controlled device by encrypted communication using the session key.

According to the embodiment above, a control device is given permission to control a controlled device only if the control device has obtained a public key of the controlled device and confirmed the authenticity of the public key. Accordingly, in an environment in which a control device can communicate with two or more controlled devices through a wireless communication network, a situation can be prevented in which the control device accidentally controls a controlled device other than a predetermined controlled device.

EMBODIMENTS

Figure 1:
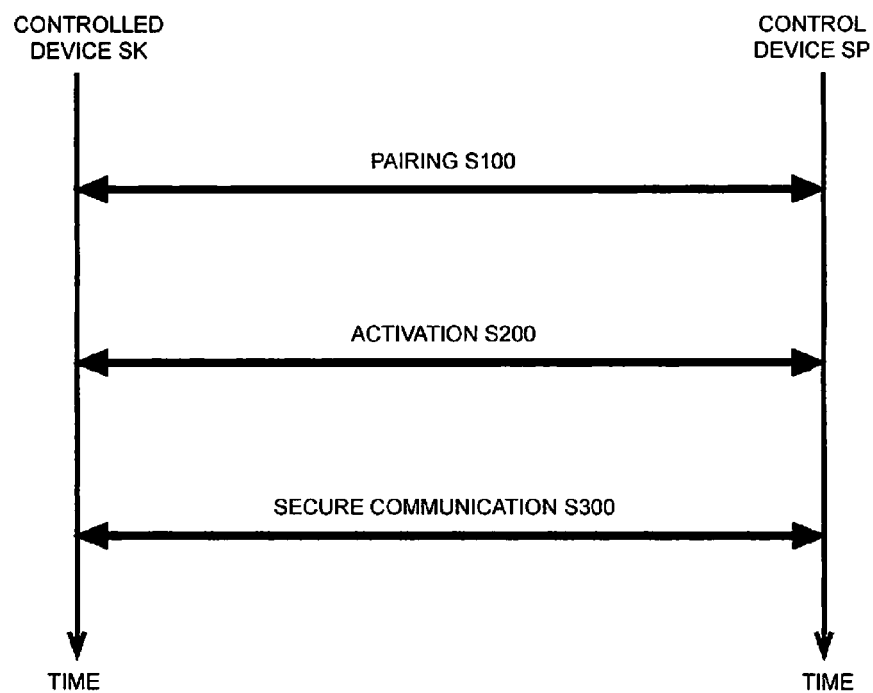
FIG. 1 is a diagram schematically illustrating a method of secure communication as an embodiment.

[Overview of Embodiment]
Hereinafter, embodiments of the invention are described. As illustrated in FIG. 1, a method of secure communication according to this embodiment is executed by communication between controlled device SK and control device SP. It should be noted that the term "controlled device" means a device controlled by a control device, and the term "control device" means a device capable of controlling a controlled device.

Communication between controlled device SK and control device SP is performed through a wireless LAN. The wireless LAN may be a Wi-Fi network. This embodiment assumes that a Wi-Fi network is constructed using a Wi-Fi router serving as an AP (Access Point). However, the method of secure communication of the invention can also be carried out in Wi-Fi Direct connections.

The method of secure communication of this embodiment broadly includes three steps: first, pairing step S100 is executed; then, activation step S200 is executed; and finally, secure communication step S300 is executed.

In pairing step S100, a verification is made as to whether or not an authentication random number displayed on the display device by controlled device SK and a random number inputted to control device SP are identical. If the two numbers are identical, a public key of controlled device SK is transferred to control device SP, and pairing is successfully accomplished.

In activation step S200, a verification is made as to whether or not control device SP which has sent a request for activation to controlled device SK has an authentic public key of the controlled device SK, and, if the control device SP has an authentic public key of the controlled device SK, activation is successfully accomplished, and the control device SP and the controlled device SK share a session key.

In secure communication step S300, control device SP and controlled device SK perform secure communication using the session key, and control device SP controls controlled device SK.

[Configuration of Control Device]

Figure 2:
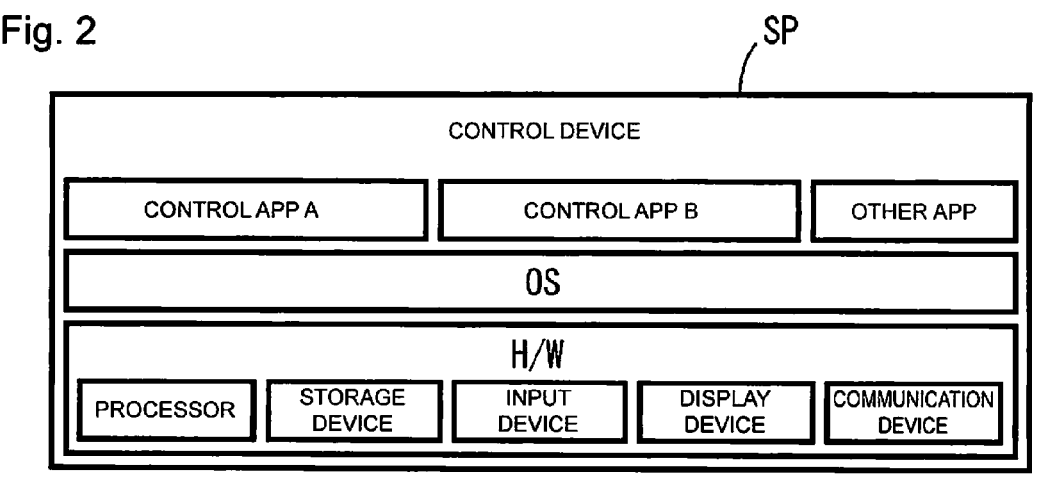
FIG. 2 is a diagram schematically illustrating the configuration of a control device illustrated in FIG. 1.

The configuration of control device SP in this embodiment is illustrated in FIG. 2. In this embodiment, control device SP includes computer components, executes an OS (Operating System) on various hardware (H/W) devices, and further executes various application programs (apps) on the OS.

Control device SP includes as hardware devices a processor for providing various functions by executing programs and a storage device for storing information, which the processor uses in processing. Control device SP also includes an input device, which is used by a user to input information and a display device for displaying information to the user. Control device SP further includes a communication device for communicating with controlled device SK. In this embodiment, the communication device is a Wi-Fi interface.

On the OS, control app A, control app B, and other apps are launched. The control apps have the function of executing the method of secure communication of this embodiment and functions for controlling controlled device SK. Any process performed by control device SP is realized by the execution of a predetermined program by the processor.

[Configuration of Controlled Device]

Figure 3:
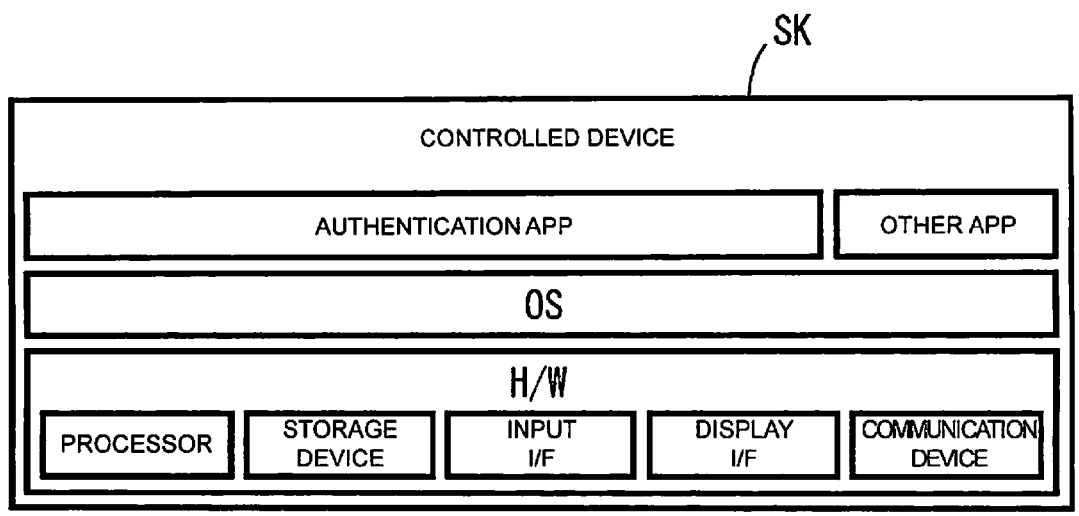
FIG. 3 is a diagram schematically illustrating the configuration of a controlled device illustrated in FIG. 1.

Next, the configuration of controlled device SK is illustrated in FIG. 3. In this embodiment, controlled device SK also includes computer components, executes an OS (Operating System) on various hardware (H/W) devices, and further executes various application programs (apps) on the OS.

Controlled device SK includes as hardware devices a processor for providing various functions by executing programs and a storage device for storing information which the processor uses in processing. Controlled device SK also includes an input interface (input I/F) for connecting an input device thereto and a display interface (display I/F) for connecting a display device thereto. Controlled device SK further includes a communication device for communicating with control device SP. In this embodiment, the communication device is a Wi-Fi interface.

On the OS, an authentication app and other apps are launched. The authentication app has the function of executing the method of secure communication of this embodiment. Any process performed by controlled device SK is realized by the execution of a predetermined program by the processor.

[Pairing]

Figure 4:
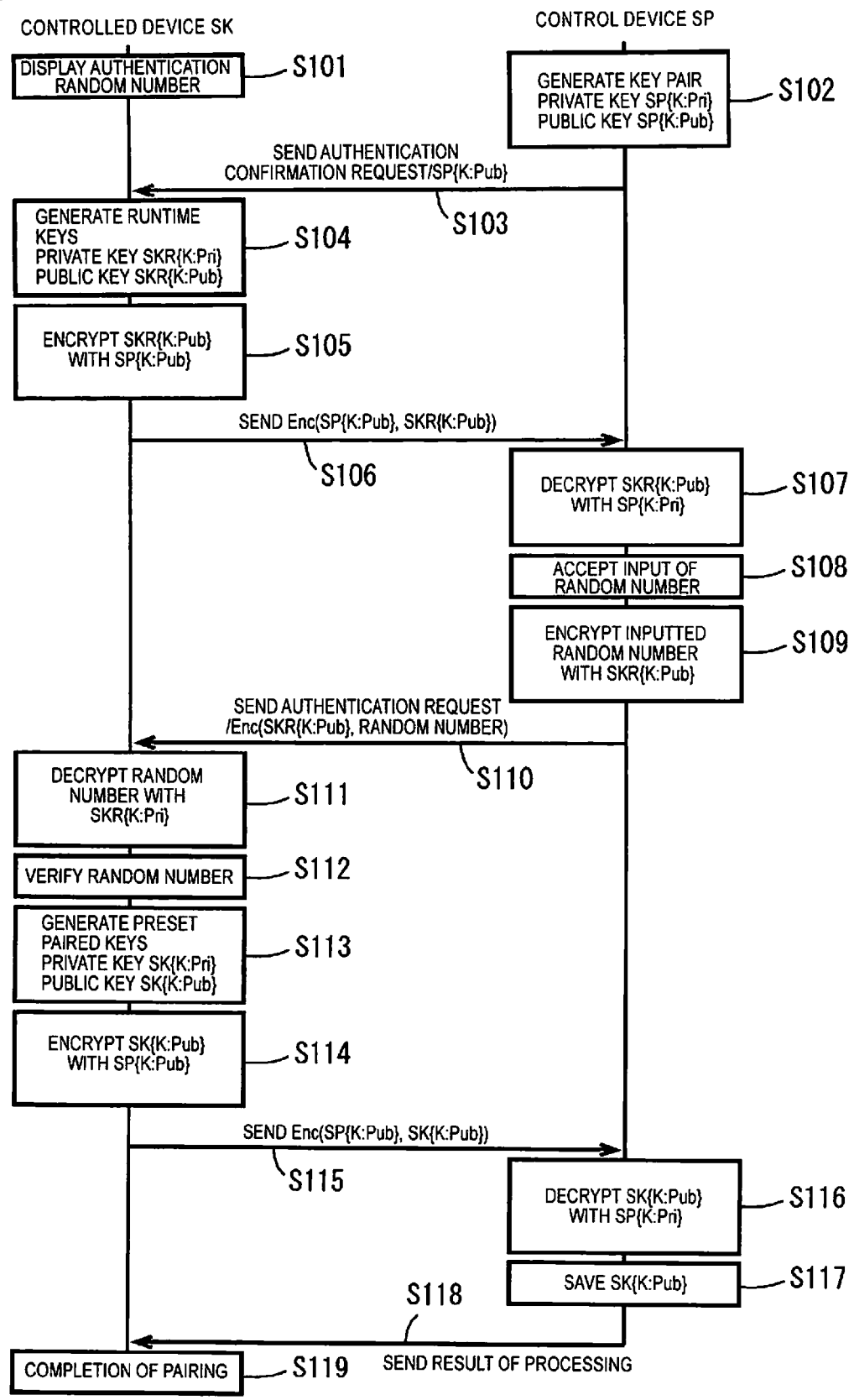
FIG. 4 is a flowchart of pairing illustrated in FIG. 1.

Next, pairing step S100 performed between controlled device SK and control device SP is described with reference to FIG. 4. In general, pairing step S100 is executed only once for each pair of control device SP and controlled device SK. Although the Wi-Fi network may include two or more controlled devices SK, one control device SP and one controlled device are paired by a single execution of pairing. Repeating a pairing process enables one control device SP to be paired with two or more controlled devices SK, and also enables one controlled device SK to be paired with two or more control devices SP.

When controlled device SK is set to a pairing mode, controlled device SK generates authentication random number RKS, stores authentication random number RKS into the storage device, and displays authentication random number RKS on a display device connected to the display I/F (S101). The user of control device SP operates the input device of control device SP, and gives control device SK an instruction to send an authentication confirmation request to controlled device SK. Control device SP which has received the instruction generates a key pair and stores the key pair into the storage device (S102). In this example, control device SP generates private key SP{K:Pri} and public key SP{K:Pub}. Then, control device SP broadcasts an authentication confirmation request to the Wi-Fi network including controlled device SK (S103). Control device SP appends the public key SP{K:Pub} of the control device SP to this authentication confirmation request.

Controlled device SK, which has received the authentication confirmation request generates runtime keys and stores the runtime keys into the storage device (S104). In this example, controlled device SK generates private key SKR{K:Pri} and public key SKR{K:Pub}. Then, controlled device SK encrypts runtime public key SKR{K:Pub} with public key SP{K:Pub} obtained from control device SP (S105), and sends the encrypted public key SKR{K:Pub} to control device SP (S106). The expression Enc(K, D) in the drawing represents data D encrypted with key K.

Control device SP decrypts runtime public key SKR{K:Pub} received from controlled device SK with its own private key SP{K:Pri}, and stores the decrypted runtime public key SKR{K:Pub} into the storage device (S107). Subsequently, control device SP accepts the input of a random number from the input device (S108). The user of control device SP inputs the authentication random number (authentication random number displayed in S101) displayed on the display device by controlled device SK located in front of the user, to control device SP by operating the input device. Control device SP which has accepted the input of the random number encrypts the inputted random number with runtime public key SKR{K:Pub} of controlled device SK, and sends an authentication request with the encrypted random number appended thereto to controlled device SK (S110).

Controlled device SK which has received the random number from control device SP decrypts the random number with its own runtime private key SKR{K:Pri} (S111), and verifies whether or not the authentication random number displayed in S101 and the random number received from control device SP are identical (S112). If the verification result indicates that the authentication random number differs from the received random number, controlled device SK assumes that pairing has failed, and terminates the process.

On the other hand, if the authentication random number is identical to the received random number, controlled device SK generates preset paired keys and stores the preset paired keys into the storage device (S113). In this example, controlled device SK generates private key SK{K:Pri} and public key SK{K:Pub}. Then, controlled device SK encrypts its own public key SK{K:Pub} with the public key SP{K:Pub} of the control device SP, and sends the encrypted public key SK{K:Pub} to control device SP (S115).

Control device SP which has received the public key SK{K:Pub} of the controlled device SK decrypts the public key with its own private key SP{K:Pri}, and saves decrypted public key SK{K:Pub} of controlled device SK into the storage device (S117). This causes the public key of controlled device SK located in front of the user operating the control device SP to be saved on control device SP.

Then, control device SP notifies controlled device SK that the process has successfully completed (S118), and controlled device SK which has received this notification terminates this single execution of the pairing process (S119). If pairing fails partway through the process or if pairing successfully completes, controlled device SK performs a next execution of the pairing process from S101.

With the above-described pairing step S100, through encrypted communication using public key authentication, pairing with controlled device SK located in front of the user operating the control device SP can be performed, and the public key of the controlled device SK is saved on control device SP. This means that the user of control device SP has specified controlled device SK, which the user wants to use.

It should be noted that the phrase "controlled device located in front of the user" means a controlled device located at such a place that the user can see the above-described authentication random number. Moreover, the timing of displaying the random number and the timing of generating each encryption key are not necessarily limited to those in the above-described embodiment because it is acceptable to generate the random number and the encryption key at least immediately before the use thereof.

[Activation]

Figure 5:
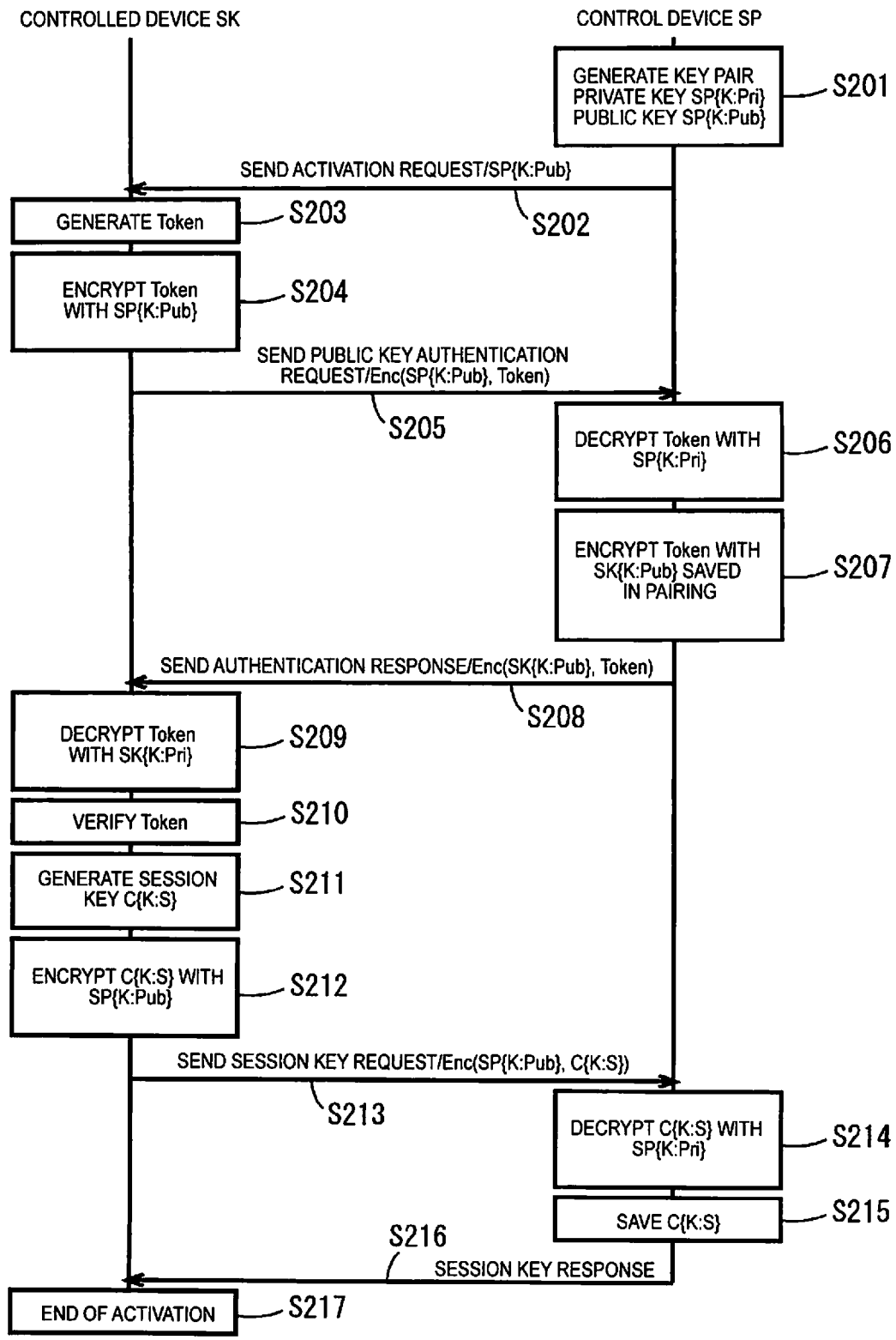
FIG. 5 is a flowchart of activation illustrated in FIG. 1.

Next, activation step S200 is described with reference to FIG. 5. In the case where the user of control device SP wants to control controlled device SK, the user operates the input device of control device SP to start an activation process.

Control device SP, which has started the activation process first generates a key pair and stores the key pair into the storage device (S201). In this example, control device SP generates private key SP{K:Pri} and public key SP{K:Pub}. The values of private key SP{K:Pri} and public key SP{K:Pub} of control device SP may differ from the values of the aforementioned keys generated in pairing step S100. Then, control device SP broadcasts an activation request to controlled device SK within the Wi-Fi network (S202). Control device SP appends public key SP{K:Pub} of control device SP to this request.

Controlled device SK, which has received the activation request generates a Token and stores the Token into the storage device (S203). Subsequently, controlled device SK encrypts the Token with public key SP{K:Pub} obtained from control device SP (S204), and sends a public key authentication request with the encrypted Token appended thereto to control device SP (S205).

Control device SP which has received the public key authentication request decrypts the Token appended to the request with its own private key SP{K:Pri} (S206), and also encrypts the Token with public key SK{K:Pub} of controlled device SK saved in the aforementioned pairing step S100 (S207). Then, control device SP sends an authentication response with the encrypted Token appended thereto to controlled device SK (S208).

Controlled device SK which has received the authentication response decrypts the Token appended to the response with its own private key SK{K:Pri} (private key generated in pairing step S100), and verifies whether or not the value of the decrypted Token is identical to that of the Token generated in step S203 (S210). If the result indicates that the Token values differ, controlled device SK assumes that activation has failed, and terminates the connection to control device SP. In the case where controlled device SK cannot decrypt the Token, controlled device SK performs the same.

On the other hand, if the Token values are identical, controlled device SK regards control device SP with which controlled device SK is communicating, as control device SP already paired with controlled device SK. In that case, controlled device SK generates a session key C{K:S} to be used in secure communication step S300 performed later and stores the session key C{K:S} into the storage device (S211). Then, controlled device SK encrypts generated session key C{K:S} with public key SP{K:Pub} of control device SP, and sends a session key request with the encrypted session key appended thereto to control device SP (S213).

Control device SP decrypts session key C{K:S} sent from controlled device SK with its own private key SP{K:Pri} (S214), and stores the decrypted session key C{K:S} into the storage device (S215). Then, control device SP sends controlled device SK a notification as a session key response to the effect that control device SP has received the session key (S216). Controlled device SK which has received this notification terminates the activation process (S217).

With the above-described activation process, controlled device SK allows control device SP to share the session key after controlled device SK confirms that control device SP which has sent a request for activation thereto has already been paired with controlled device SK. This gives the control device SP permission to control controlled device SK. Performing this activation step S200 before controlling controlled device SK ensures that controlled device SK intended by control device SP is controlled.

[Secure Communication]

When activation step S200 successfully completes, then secure communication step S300 is executed. Specifically, encrypted communication using session key C{K:S} is performed between control device SP and controlled device SK which have finished activation, and controlled device SK can be controlled from control device SP. During communication, successful encryption and decryption using the session key confirms that each of control device SP and controlled device SK is a proper communication partner of the other.

[Effects of This Embodiment]

Figure 6:
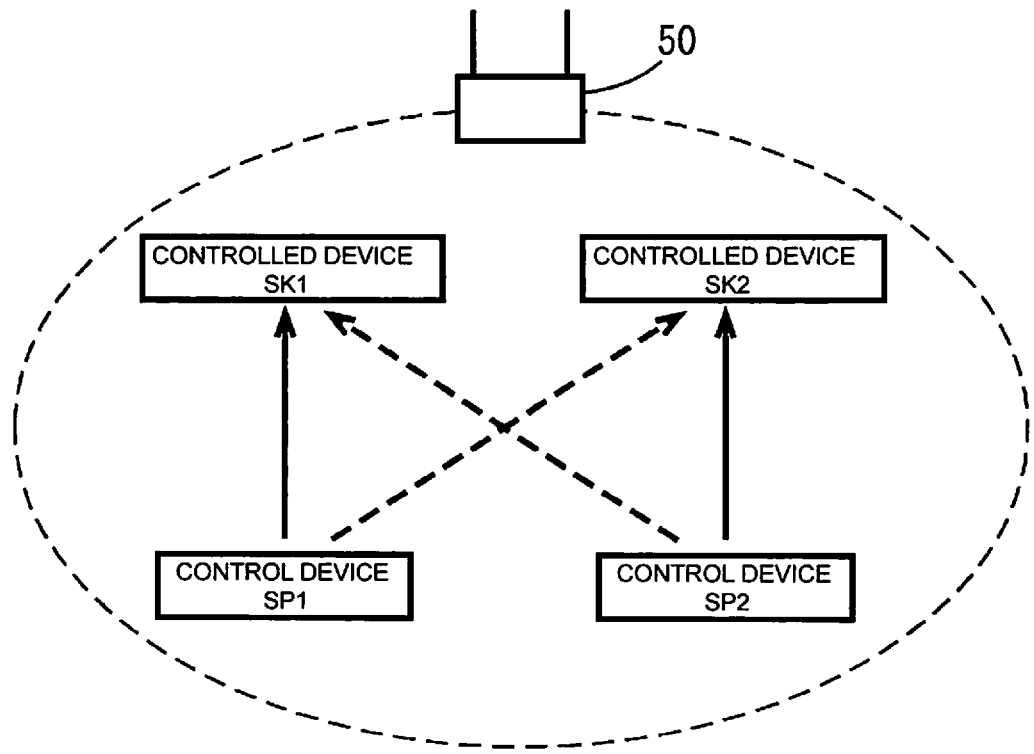
FIG. 6 is a diagram for explaining an effect of this embodiment.

As illustrated in FIG. 6, the embodiment described above makes it possible, in a Wi-Fi network constructed using a Wi-Fi router 50, to set control device SP1 to a state in which control device SP1 can control controlled device SK1 but cannot control controlled device SK2 and to set control device SP2 to a state in which control device SP2 can control controlled device SK2 but cannot control controlled device SK1, by control device SP1 performing pairing and activation with controlled device SK1 and by control device SP2 performing pairing and activation with controlled device SK2. This prevents a situation in which control device SP accidentally controls a wrong controlled device SK.

[Pairing Per Application]

Figure 7:
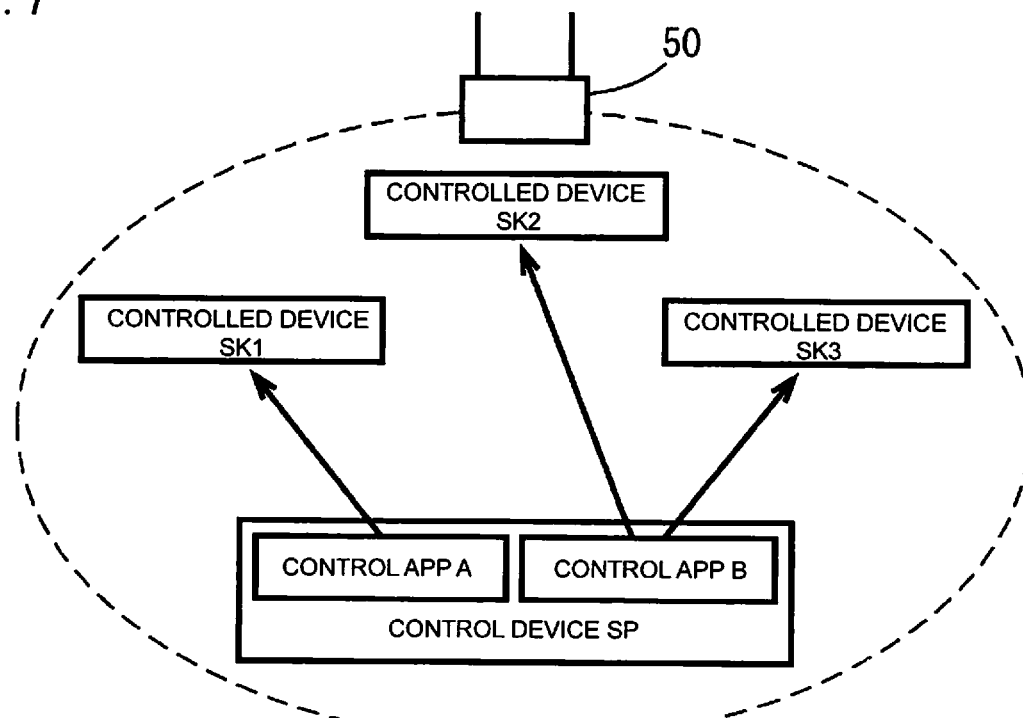
FIG. 7 is a diagram for explaining an effect of this embodiment.

In the above-described embodiment, pairing step S100 can be performed per application. For example, as illustrated in FIG. 7, in control device SP in which control app A and control app B can be activated, control app A performs pairing step S100 to obtain a public key of controlled device SK1, and saves the public key into the storage device in association with control app A. On the other hand, control app B performs pairing step S100 twice to obtain respective public keys of controlled devices SK2 and SK3, and saves the respective public keys into the storage device in association with control app B.

The above-described pairing enables control device SP to successfully complete activation with controlled device SK1 using control app A and to control controlled device SK1. Moreover, the above-described pairing enables control device SP to successfully complete activation with controlled device SK2 or SK3 using control app B and to control controlled device SK2 or SK3.

In the case where one control app is paired with two or more controlled devices SK, the control app displays available controlled device options on the display device at the time of starting an activation process, and allows the user to select a controlled device. The operation of selecting a controlled device is performed by the user operating the input device. The control device executes activation with the controlled device selected by the user. This enables the controlled device selected by the user to be controlled.

[Other Embodiments]

It should be noted that the invention is not limited to the above-described embodiment. For example, the hardware configuration is just one example. Moreover, pairing may only include the step of saving a public key of a controlled device on a control device in a public key authentication system. Moreover, in activation, the controlled device may only be capable of identifying the control device to which the controlled device has transferred the public key of the controlled device in the pairing phase. The OS may be any one of a multi-tasking OS and a single-tasking OS.

In this way, in an environment in which a control device can communicate with two or more controlled devices through a wireless LAN, embodiments above prevent a situation in which the control device accidentally controls a controlled device other than a predetermined controlled device.

The invention claimed is:

1. A method of secure communication between a control device and a controlled device over a wireless local area network (LAN), the method comprising: pairing; activation; and secure communication, wherein the pairing comprising:
the controlled device generating an authentication random number, storing the authentication random number into a first storage device, and displaying the authentication random number on a display device of the controlled device;
the control device accepting input of a random number from an input device and transferring the inputted random number to the controlled device by encrypted communication; and
the controlled device verifying whether or not the displayed authentication random number and the random number transferred from the control device are identical, and, when the authentication random number and the inputted random number are identical, transferring a public key of the controlled device to the control device by encrypted communication, and causing the control device to store the public key into a second storage device, the activation comprising:
the controlled device generating a token to obtain a generated token, storing the generated token into the first storage device, and transferring the generated token to the control device by encrypted communication;
the control device encrypting the generated token with the public key of the controlled device to create an encrypted token, and transferring the encrypted token to the controlled device; and
the controlled device decrypting the encrypted token transferred from the control device with a private key corresponding to the public key to obtain a decrypted token, verifying whether or not the decrypted token and the generated token are identical, and, when the decrypted token and the generated token are identical, generating a session key, storing the session key into the first storage device, transferring the session key to the control device by encrypted communication, and causing the control device to store the session key into the second storage device, and the secure communication comprising:
the control device controlling the controlled device by encrypted communication using the session key.

2. The method according to claim 1, wherein the control device controls at least a first application and a second application stored in the controlled device and to be run by the controlled device, and wherein the pairing steps are separately performed for enabling secure communication between the control device and the controlled device for operation of the first application by the controlled device and for operation of the second application by the controlled device.

3. The method according to claim 1, wherein the control device controls the controlled device and another controlled device separate from the controlled device, the pairing further comprising:
providing, on the display device of the controlled device, information to enable a user of the control device to set up secure communications with only the controlled device, with only the another controlled device, or with both the controlled device and the another controlled device;
receiving user-input regarding whether the user wants to set up encrypted communications with only the controlled device, with only the another controlled device, or with both the controlled device and the another controlled device; and
initiating at least one pairing procedure based on the received user-input.

4. A controlled device that communicates with a control device over a wireless local area network (LAN), the controlled device comprising at least: a display interface; a processor; a first storage device; and a communication device, wherein the processor executes pairing, activation, and secure communication, the pairing comprises:
generating an authentication random number, storing the authentication random number into the first storage device, displaying the authentication random number on a display device of the controlled device, verifying whether or not the displayed authentication random number and a random number transferred from the control device to the communication device are identical, and, when the authentication random number and the random number transferred from the control device are identical, transferring a public key of the controlled device to the control device through the communication device by encrypted communication, and causing the control device to store the public key into a second storage device, the activation comprises:
generating a token, storing the generated token into the first storage device, transferring the generated token to the control device through the communication device by encrypted communication, receiving at the communication device a token encrypted with the public key of the controlled device by the control device, decrypting the received token with a private key corresponding to the public key, verifying whether or not the received token and the generated token are identical, and, when the two tokens received token and the generated token are identical, generating a session key, storing the session key into the first storage device, transferring the session key to the control device through the communication device by encrypted communication, and causing the control device to store the session key into the second storage device, and the secure communication comprises:
accepting controlling from the control device through the communication device by encrypted communication using the session key.

5. The controlled device according to claim 4, wherein the control device controls at least a first application and a second application stored in the controlled device and to be run by the controlled device, and wherein the pairing steps are separately performed for enabling secure communication between the control device and the controlled device for operation of the first application by the controlled device and for operation of the second application by the controlled device.

6. The controlled device according to claim 4, wherein the control device controls the controlled device and another controlled device separate from the controlled device, the pairing further comprising:
providing, on the display device of the controlled device, information to enable a user of the control device to set up secure communications with only the controlled device, with only the another controlled device, or with both the controlled device and the another controlled device;
receiving user-input regarding whether the user wants to set up encrypted communications with only the controlled device, with only the another controlled device, or with both the controlled device and the another controlled device; and
initiating at least one pairing procedure based on the received user-input.

7. A control program for a control device which performs secure communication with a controlled device over a wireless local area network (LAN), the control device comprising at least: an input device; a processor; a storage device; and a communication device, the control program causing the processor to execute pairing, activation, and secure communication,
wherein in the pairing, the control program causes the processor to:
prompt a user to input from an input device of the control device an authentication random number displayed on a display device of the controlled device, and transfer the inputted random number to the controlled device through the communication device by encrypted communication; and, when the displayed authentication random number and the inputted random number are identical, receive a public key of the controlled device sent from the controlled device by encrypted communication, and store the public key into the storage device, in the activation, the control program causes the processor to:
receive a token generated by the controlled device through the communication device by encrypted communication, encrypt the received token with the public key of the controlled device to obtain an encrypted token, and send the encrypted token to the controlled device through the communication device as a sent token; and receive a session key through the communication device by encrypted communication, the session key transferred from the controlled device when the sent token decrypted with a private key of the controlled device is identical to the generated token, and store the session key into the storage device, and in the secure communication, the control program causes the processor to:
control the controlled device by encrypted communication using the session key.

8. The control program according to claim 7, wherein the control device controls at least a first application and a second application stored in the controlled device and to be run by the controlled device, and wherein the pairing steps are separately performed for enabling secure communication between the control device and the controlled device for operation of the first application by the controlled device and for operation of the second application by the controlled device.

9. The control program according to claim 7, wherein the control device controls the controlled device and another controlled device separate from the controlled device, wherein in the pairing, the control program further causes the processor to:
provide, on the display device of the controlled device, information to enable a user of the control device to set up secure communications with only the controlled device, with only the another controlled device, or with both the controlled device and the another controlled device;
receive user-input regarding whether the user wants to set up encrypted communications with only the controlled device, with only the another controlled device, or with both the controlled device and the another controlled device; and
initiate at least one pairing procedure based on the received user-input.

* * * * *